US006731802B1

United States Patent
Kacmarcik et al.

(10) Patent No.: US 6,731,802 B1
(45) Date of Patent: May 4, 2004

(54) LATTICE AND METHOD FOR IDENTIFYING AND NORMALIZING ORTHOGRAPHIC VARIATIONS IN JAPANESE TEXT

(75) Inventors: Gary Kacmarcik, Bothell, WA (US); Christopher J. Brockett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/563,636

(22) Filed: May 2, 2000

Related U.S. Application Data

(60) Provisional application No. 60/176,152, filed on Jan. 14, 2000.

(51) Int. Cl.[7] .............................. G06K 9/18; G06K 9/72; G06F 7/00
(52) U.S. Cl. ........................ 382/185; 382/229; 707/102
(58) Field of Search ................................ 382/185, 186, 382/187, 229, 230, 135, 137, 138, 175; 704/9; 707/3, 5, 102

(56) References Cited

U.S. PATENT DOCUMENTS

| | | | |
|---|---|---|---|
| 3,969,700 A | 7/1976 | Bollinger et al. ............ 382/231 |
| 4,942,526 A | 7/1990 | Okajima et al. ............... 704/10 |
| 5,168,533 A | * 12/1992 | Kato et al. .................... 382/229 |
| 5,299,125 A | 3/1994 | Baker et al. ..................... 704/9 |
| 5,305,396 A | * 4/1994 | Betts et al. .................. 382/175 |
| 5,448,474 A | 9/1995 | Zamora ........................... 704/9 |
| 5,469,354 A | * 11/1995 | Hatakeyama et al. ........... 707/3 |
| 5,778,361 A | * 7/1998 | Nanjo et al. ..................... 707/5 |
| 5,806,021 A | 9/1998 | Chen et al. ...................... 704/9 |
| 5,917,941 A | 6/1999 | Webb et al. ................. 382/177 |
| 5,946,648 A | 8/1999 | Halstead, Jr. et al. ............ 704/9 |
| 5,963,893 A | 10/1999 | Halstead, Jr. et al. ............ 704/9 |
| 6,175,834 B1 | * 1/2001 | Cai et al. ..................... 707/102 |

FOREIGN PATENT DOCUMENTS

| | | |
|---|---|---|
| WO | WO 98/08169 | 2/1998 |
| WO | WO 99/62001 | 12/1999 |

OTHER PUBLICATIONS

Yeh et al., "Rule–Based Word Identification For Mandarin Chinese Sentences—A Unification Approach", for *Computer Processing of Chinese & Oriental Languages*, vol. 5, No. 2 (Mar. 1991).

Nie et al., "Unknown Word Detection and Segmentation of Chinese Using Statistical and Heuristic Knowledge", for *Communication of COLIPS*, vol. 5, Nos. 1 & 2, pp. 47–57 (Dec. 1995).

Teller et al., "A Probabilistic Algorithm for Segmenting Non–Kanji Japanese Strings", for Natural Language Processing (Jul. 31, 1994).

(List continued on next page.)

*Primary Examiner*—Mehrdad Dastouri
(74) *Attorney, Agent, or Firm*—Westman, Champlin & Kelly, P.A.

(57) ABSTRACT

A lattice data structure suitable for storage on a computer-readable medium is provided which represents a plurality of orthographic forms of a Japanese lexical entry. The lattice includes a plurality of data fields each adapted to hold data representing a word element of the entry. Each data field includes a first subfield containing data representing a primary form of the corresponding word element and a second field containing data representing an alternate form of the corresponding word element. Also provided is a method of normalizing Japanese lexical entries to produce a normalized form that includes the primary form of each word-element representation of the lattice and does not include the alternate forms. Also provided are methods of segmenting text using the disclosed lattice.

48 Claims, 10 Drawing Sheets

OTHER PUBLICATIONS

"Method of Segmenting Texts into Words" for *IBM Technical Disclosure Bulletin*, vol. 39, No. 11, pp. 115–118 (Nov. 1996).

Chen et al., "Word Identification for Mandarin Chinese Sentences" Proceedings of the 14$^{th}$ International Conference on Computational Linguistics, pp. 101–107, Nantes, France (Coling '92).

Wu et al., "Chinese Text Segmentation for Text Retrieval: Achievements and Problems", Journal of the American Society for Information Science, 44(9): 532–542 (1993).

Chang et al., "A Multiple–Corpus Approach to Recognition of Proper Names in Chinese Texts", Computer Processing of Chinese and Oriental Languages, vol. 8, No. 1, pp. 75–85 (Jun. 1994).

Sproat et al., "A Stochastic Finite–State Word Segmentation Algorithm for Chinese", Computational Linguistics, vol. 22, No. 3, pp. 377–404 (1996).

Guo, J., "Critical Tokenization and it Properties", Computational Linguistics, vol. 23, No. 4, pp. 569–595 (1997).

Huang et al., "A Quick Method for Chinese Word Segmentation", IEEE Conf. of Intelligent Processing Systems, pp. 1773–1776 (Oct. 28–31, 1997).

Fan et al., "Automatic Word Identification in Chinese Sentences by the Relaxation Technique", Computer Processing of Chinese and Oriental Languages, vol. 4, No. 1, pp. 33–56 (Nov. 1988).

* cited by examiner

LATTICE AND METHOD FOR IDENTIFYING AND NORMALIZING ORTHOGRAPHIC VARIATIONS IN JAPANESE TEXT

CROSS-REFERENCE TO RELATED APPLICATION

This application claims the benefit of U.S. Provisional Patent Application No. 60/176,152 entitled "LATTICE AND METHOD FOR IDENTIFYING AND NORMALIZING ORTHOGRAPHIC VARIATIONS IN JAPANESE TEXT," filed on Jan. 14, 2000.

FIELD OF THE INVENTION

The present invention relates generally to a computer-based method for identifying text. More particularly, the present invention relates to a lattice and method for identifying and normalizing orthographic variations in Japanese text.

BACKGROUND OF THE INVENTION

Word segmentation refers to the process of identifying the individual words that make up an expression of language, such as text. Word segmentation is useful for checking spelling and grammar, synthesizing speech from text, performing natural language parsing and understanding, and searching a collection of documents for specific words or phrases, all of which benefit from an identification of individual words.

Performing word segmentation of English text is rather straightforward, since spaces and punctuation marks generally delimit the individual words in the text. In Japanese text however, word boundaries are implicit rather than explicit. That is, Japanese text typically does not include spaces or punctuation between words. Therefore, segmentation cannot be performed in the same manner as English word segmentation. Other characteristics of Japanese text further complicate the matter. For example, potential word candidate records may overlap (causing ambiguities for the parser) or there may be gaps where no suitable record is found (causing a broken span). Also, the language includes four different scripts that are in common use—kanji, hiragana, katakana and roman. Furthermore, these different scripts can be mixed within lexical entries. Additionally, many Japanese words have a variety of acceptable spellings and certain characters are optional.

Existing segmenting methods involve adding orthographic variations to the lexicon as they are encountered (requiring a long-term maintenance commitment), or lexicalizing all possible variations (requiring a much larger lexicon). An accurate and efficient approach to automatically performing Japanese word segmentation would have significant utility.

The present invention provides a solution to this and other problems and offers other advantages over the prior art.

SUMMARY OF THE INVENTION

The present invention relates to a lattice and method for identifying and normalizing orthographic variations in Japanese text.

One embodiment of the present invention is directed to a computer-readable medium having stored thereon a data structure that includes multiple data fields collectively representing a Japanese lexical entry. The multiple data fields include a plurality of multi-form data fields. Each multi-form data field is capable of holding data representing a word element of the lexical entry. Each multi-form data field includes two subfields. The first subfield contains data representing a primary form of the corresponding word element. The second subfield contains data representing an alternate form of the corresponding word element.

In an illustrative embodiment of the invention the data structure includes a lattice of the form:

[W:ab][X:c] . . . [Y:def]

where W, X and Y each represent a primary-orthography character; a, b, c, d, e, and f each represent an alternate orthography character; ab, c, and def represent an alternate representation to W, X and Y, respectively; and the lattice as a whole represents a plurality of orthographic forms of the lexical entry.

Another embodiment of the present invention is directed to a method of normalizing orthographic variations in the Japanese language. According to this method, an orthography lattice is maintained for each of multiple lexical entries. Each lattice represents a plurality of orthographic forms of the lexical entry and includes at least one word-element representation representing multiple forms of a word element of the lexical entry. Each word-element representation includes a primary form of the word element and an alternate form of the word element. Each lattice is normalized to produce a normalized form that includes the primary form of each word element representation of the lattice and that does not include the alternate form of each word element representation.

Another embodiment of the present invention is directed to a method of segmenting Japanese text. According to the method, an orthography lattice is stored for each of multiple lexical entries. Each lattice represents a plurality of orthographic forms of the lexical entry and includes at least one word-element representation representing a plurality of forms of a word element of the lexical entry. Each word-element representation includes a primary form of the word element and an alternate form of the word element. A sequence of input characters is received and the input sequence is evaluated against the plurality of lattices. If any orthographic form of one of the lexical entries is present in the input sequence, a normalized form of that lexical entry is generated that comprises the primary form of each word-element representation of the lattice corresponding to the entry and that does not include the alternate form of each word-element representation.

Another embodiment of the present invention is directed to a another, method of segmenting Japanese text. According to the method, an orthography lattice is stored for each of multiple lexical entries. Each lattice represents a plurality of orthographic forms of the lexical entry. Each lattice includes at least one word-element representation. Each word-element representation represents multiple different forms of the corresponding word element of the lexical entry. Each word-element representation can include a primary form of the word element and an alternate form of the word element. A character input that is part of an input string is received. The received character input is compared to the first word-element representation of each lattice. If the received character input matches either the primary form or the alternate form of the first word-element representation of a particular lattice, the subsequent characters in the input string are compared to further word-element representations in the particular lattice in order to ascertain whether any orthographic forms of the lexical entry corresponding to the particular lattice are present in the input string beginning with the received character input. In an illustrative aspect of this embodiment of the invention, if any orthographic forms of the lexical entry corresponding to the particular lattice are present in the input string beginning with the received character input, a normalized representation of the lexical entry is generated which includes the primary form of each word-element representation of the lattice and that does not include the alternate form of each word-element representation.

Another embodiment of the present invention is directed to yet another method of segmenting Japanese text. According to this method, an orthography lattice is stored for each of a plurality of lexical entries. An all-alternate-orthography form is also stored for each lexical entry. Each all-alternate-orthography form consists exclusively of alternate orthography characters and does not contain any primary orthography characters. An input character that is part of an input string of characters is received. It is determined whether the received input character is a primary orthography character or an alternate orthography character. If the received input character is an alternate orthography character, the input character is compared to the first character of each stored all-alternate-orthography form. Then, if the input character matches the first character of a particular all-alternate-orthography form, subsequent characters in the input string are compared to further characters in the particular all-alternate-orthography form. In this way, it is ascertained whether the all-alternate-orthography form of the corresponding lexical entry is present in the input string beginning with the received input character. If, on the other hand, the received input character is a primary orthography character, the input character is compared to the primary form of the first word-element representation of each lattice. Then, if the received input character matches the primary form of the first word-element representation of a particular lattice, subsequent characters in the input string are compared to further word-element representations in the particular lattice, thereby ascertaining whether any orthographic forms of the lexical entry corresponding to the particular lattice are present in the input string beginning with the received input character. In an illustrative aspect of this embodiment of the invention, if any orthographic forms of the lexical entry corresponding to the particular lattice are present in the input string beginning with the received input character, a normalized representation of the lexical entry is generated which includes the primary form of each word-element representation of the lattice corresponding to the entry and that does not include the alternate form of each word-element representation.

In an illustrative embodiment of the above method, for each lexical entry that contains two or more word elements, a look-back indicator is stored for each non-initial word element-in the lexical that contains a primary/alternate orthography pair. Each look-back indicator includes data that indicates the primary form of the corresponding word element, the primary form of the first word element in the lexical entry, and the first character of an alternate-orthography form of the first word element in the lexical entry. Each look-back indicator also indicates the difference in character position between the corresponding word element and the first character of the alternate-orthography form of the first word element in the lexical entry when all of the word elements occurring before the corresponding word element in the corresponding lexical entry are alternate form word elements. If the received input character is a primary-orthography character, the input character is compared to the primary form of the word element corresponding to each of a plurality of look-back indicators.

If the received input character matches the primary form of the word element corresponding to a particular look-back indicator, the character in the input string that precedes the received input character by the difference indicated by the look-back indicator is evaluated. If the evaluated character matches the first character of the alternate-orthography form of the first word element indicated by the look-back indicator, and each character between the received input character and the evaluated character in the input string is an alternate orthography character, the primary form of the first word element in the lexical entry, as indicated by the look-back indicator, is compared to the primary form of the first word-element representation of each lattice. If the primary form of the first word element in the lexical entry, as indicated by the look-back indicator, matches the primary form of the first word-element representation of a particular lattice, the alternate form of the first word-element representation of the particular lattice is compared to the evaluated character and subsequent characters in the input string. If the alternate form of the first word-element representation of the particular lattice matches the evaluated character and subsequent characters in the input string, further subsequent characters in the input string are compared to further word-element representations in the particular lattice. In this way, it is determined whether any orthographic forms of the lexical entry corresponding to the particular lattice are present in the input string beginning with the evaluated character. In an illustrative aspect of this embodiment of the invention, if any orthographic forms of the lexical entry corresponding to the particular lattice are present in the input string beginning with the evaluated character, a normalized representation of the lexical entry is generated which includes the primary form of each word-element representation of the lattice and that does not include the alternate form of each word-element representation.

DETAILED DESCRIPTION OF ILLUSTRATIVE EMBODIMENTS

Figure 1:
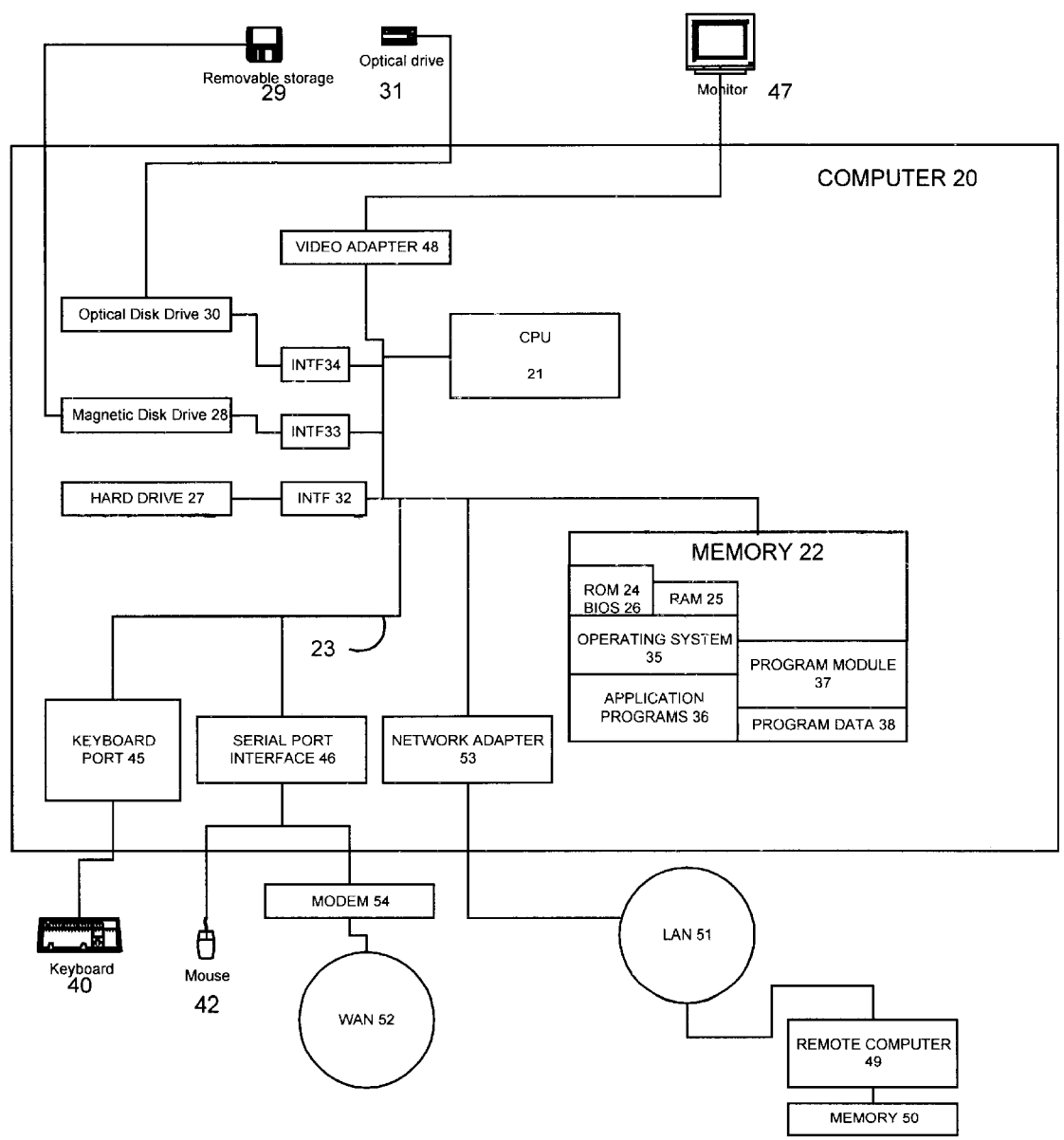
FIG. 1 is a block diagram of an exemplary general purpose computer system suitable for implementing the present invention.

Prior to a detailed discussion of the present invention, an overview of an operating environment may be helpful. FIG. 1 and the related discussion provide a brief, general description of a suitable computing environment in which the invention can be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium, In addition, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 1, an exemplary system for implementing the invention includes a general purpose computing device in the form of a conventional personal computer 50, including a processing unit 51, a system memory 52, and a system bus 53 that couples various system components including the system memory to the processing unit 51. The system bus 53 can be any of several types of bus structures including a memory bus or memory controller, a peripheral bus, and a local bus using any of a variety of bus architectures. The system memory includes read only memory (ROM) 54 and a random access memory (RAM) 55. A basic input/output system 56 (BIOS), containing the basic routine that helps to transfer information between elements within the personal computer 50, such as during start-up, is stored in ROM 54. The personal computer 50 further includes a hard disk drive 57 for reading from and writing to a hard disk (not shown), a magnetic disk drive 58 for reading from or writing to a removable magnetic disk 59, and an optical disk drive 60 for reading from or writing to a removable optical disk such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer-readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 59, optical disk 61, ROM 54 or RAM 55, including an operating system 65, one or more application programs 66, other program modules 67, and program data 68. A user can enter commands and information into the personal computer 50 through input devices such as a keyboard 70, a handwriting tablet 71, a pointing device 72 and a microphone 92. Other input devices (not shown) can include a joystick, game pad, satellite dish, scanner, or the like. These and other input devices are often connected to the processing unit 51 through a serial port interface 76 that is coupled to the system bus 53, but can be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers typically include other peripheral output devices such as a speaker 83 and a printer (not shown).

The personal computer 50 can operate in a networked environment using logic connections to one or more remote computers, such as a remote computer 79. The remote computer 79 can be another personal computer, a server, a router, a network PC, a peer device or other network node, and typically includes many or all of the elements described above relative to the personal computer 50, although only a memory storage device 80 has been illustrated in FIG. 1. The logic connections depicted in FIG. 1 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which can be internal or external, is connected to the system bus 53 via the serial port interface 76. In a network environment, program modules depicted relative to the personal computer 50, or portions thereof, can be stored in the remote memory storage devices. As appreciated by those skilled in the art, the network connections shown are exemplary and other means of establishing a communications link between the computers can be used.

The present invention provides a compact representation for the orthographic variations in Japanese text and allows specific invalid variations to be disabled. The process of disabling invalid variations is much easier than enabling valid variations because the invalid forms are identified more quickly using smaller corpora. According to the present invention, an orthography lattice is maintained for each dictionary entry. This lattice is then compiled into a data structure that can be efficiently processed during runtime.

For discussion, some terminology will be useful. As previously mentioned, there are four scripts commonly used to represent the Japanese language. Kanji are the (fairly complex looking) Japanese characters which were borrowed from Chinese. There are thousands of these characters in Japanese, and each character may have multiple "readings" (or pronunciations). Hiragana is a Japanese syllabary used to write out words based on their pronunciation. Katakana is another syllabary used to write out words. Katakana is used primarily for foreign loanwords or to emphasize words in a sentence. Kana is a term used to refer to both hiragana and katakana. Additionally, roman script is sometimes used, either by itself or in conjunction with other scripts, to represent words in Japanese.

To simplify the discussion, the following notation will be used. Uppercase letters denote the primary orthographic representation in the lattice. Typically, these are kanji characters, although symbols can also be represented this way. Lowercase letters denote the alternate representation. Typically, these are hiragana characters, although they may be katakana characters.

The present invention provides an orthography lattice that is represented as follows: [W:ab][X:c] . . . [Y:def]. An illustrative embodiment of the invention is directed to a computer-readable medium having such a lattice stored thereon. This lattice represents a plurality of orthographic forms of a lexical entry. Within the brackets, the W, X and Y each represent a primary-orthography character. The a, b, c, d, e, and f each represent an alternate-orthography character. ab, c, and def represent an alternate representation to W, X and Y, respectively. As previously mentioned, the primary orthography characters are typically kanji characters, but may also be symbols, such as greek letters, punctuation, numbers, and roman characters. The alternate orthography characters are typically kana characters. More specifically, the alternate orthography characters are typically hiragana characters, but may also be katakana characters. Some parts of some words may not be within the brackets, like in [X:ta]beru, which means "to eat". In these cases, the part outside the brackets is a word-element that has no primary-orthography representation.

Figure 2:
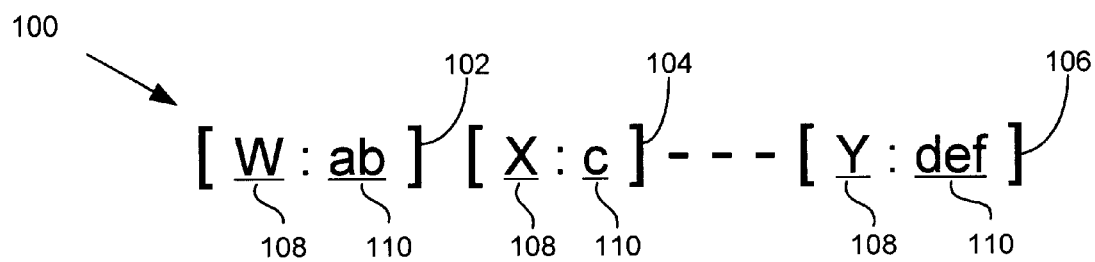
FIG. 2 represents a lattice structure according to an illustrative embodiment of the present invention.

Thus, one embodiment of the present invention is directed to a data structure as represented in FIG. 2. An illustrative embodiment of the invention is directed to a computer-readable medium having a data structure such as the one represented in FIG. 2 stored thereon The data structure of FIG. 2 includes lattice 100, which includes a plurality of data fields collectively representing the possible orthographies of a Japanese lexical entry. The plurality of data fields includes a plurality of multi-form data fields 102, 104, 106. Each multi-form data field 102, 104, 106 is adapted to hold data representing a word element of the lexical entry. A "word element," as used herein, is simply a part of a word. Multiple word elements make up a word, or, in some cases, a word may consist of a single word element. Thus, the lattice 100 can consist of any number of multi-form data fields 102, 104, 106. A word element can consist of a single character or of multiple characters. Typically, the word element represented by one of multi-form data fields 102, 104, 106 will correspond to a single kanji character (though it can also correspond to a plurality of kanji characters).

Each multi-form data field includes two subfields. One subfield 108 contains data representing a primary form of the corresponding word element. Typically, the data held in subfield 108 represents a kanji character. A second subfield 110 contains data representing an alternate form of the corresponding word element. The alternate form represented in subfield 110 is an alternate means of representing the word element represented by the primary form held in data field 108. Typically, the data held in subfield 110 represents one or more kana characters, whether they be hiragana characters or a katakana characters. As can be seen in FIG. 2, the alternate form represented in subfield 110 can consist of any number of kana characters.

By way of example, the orthography lattice [W:ab][X:cd] specifies a word "WX" that has 2 kanji characters: "W" and "X", which have respective readings (or alternate representations) of "ab" and "cd", respectively. This lattice indicates that the word WX can be written as any of "WX", "Wcd", "abX", or "abcd". The two forms that contain both upper and lower case letters ("Wcd" and "abX") are referred to as "mixed-orthography" since they contain a mixture of both the primary and alternate representations.

In an illustrative embodiment of the present invention, the full-kana form (or the full-alternate form: "abcd" in the above example) is handled in a different manner than the other forms for performance reasons. This means that 2 entries are maintained for each word: the lattice form and the kana form. Having it separated out like this allows the implementer (1) to pre-calculate information for the kana form (which is more ambiguous and may correspond to multiple words and lattices), (2) to store the kana info in a more compact representation (since there are only 50 kana characters vs. thousands of kanji), and (3) to invoke the more expensive lattice processing only when necessary.

Some multi-character compounds cannot be divided into separate word-element representations 102, 104, 106. For theses words, the primary-orthography part 108 of the word-element representation 102, 104, 106 will contain multiple characters. For example, the word "kyou" (which means "today") has two kanji but the reading (alternate orthography) cannot be sensibly divided between the two characters. Thus the lattice representation is [XY:kyou].

In an illustrative embodiment, the data structure of FIG. 2 further includes an alternate-orthography-only data field (not shown) adapted to hold data representing a word element that always consists exclusively of alternate orthography characters. Thus, the alternate-orthography-only field exists outside of the brackets, as in [X:ta]beru ("to eat").

In another illustrative embodiment, each multi-form data field 102, 104, 106 further comprises a subfield (not shown) adapted to hold data representing an optional word part that may optionally be used in conjunction with the primary form held in the first subfield. Such optional parts of words are called okurigana. In an illustrative embodiment, okurigana are represented in the lattice by commas. Thus, the lattice [W:a,b][X:c] would allow the following orthographies: "WX", "WbX", "Wc" and "Wbc" ("abc" is handled in the kana lexicon). Note that the "b" is only optional when the primary orthography "W" is used. "aX" and "ac" are not valid orthographies. Multiple okurigana for a single word element are represented by setting off each of the okurigana with a comma. For example, the lattice [W:a][X:b,c,d] allows the following acceptable variants: WX, WXd, WXcd, WXbcd, aX, aXd, aXcd. The variant abcd is handled in the kana lexicon.

In another illustrative embodiment of the present invention, each multi-form data field further comprises a subfield adapted to hold data representing an invalidity indicator that indicates that the alternate form held in the second subfield is an invalid form of the corresponding word element. In an illustrative embodiment, invalid alternate forms are suppressed using a "!" before the primary-orthography part of the word-element representation, as in [X:naga][!Y:i] (which means "a long stay"). This lattice would allow the following orthographies: "XY" and "nagaY". This is useful because there is a very common word [X:naga]i (which means "long") which would preclude the alternate form of "Y" being used. Note that "nagai" is ambiguous between the two words. This is why it is handled separately.

Figure 3:
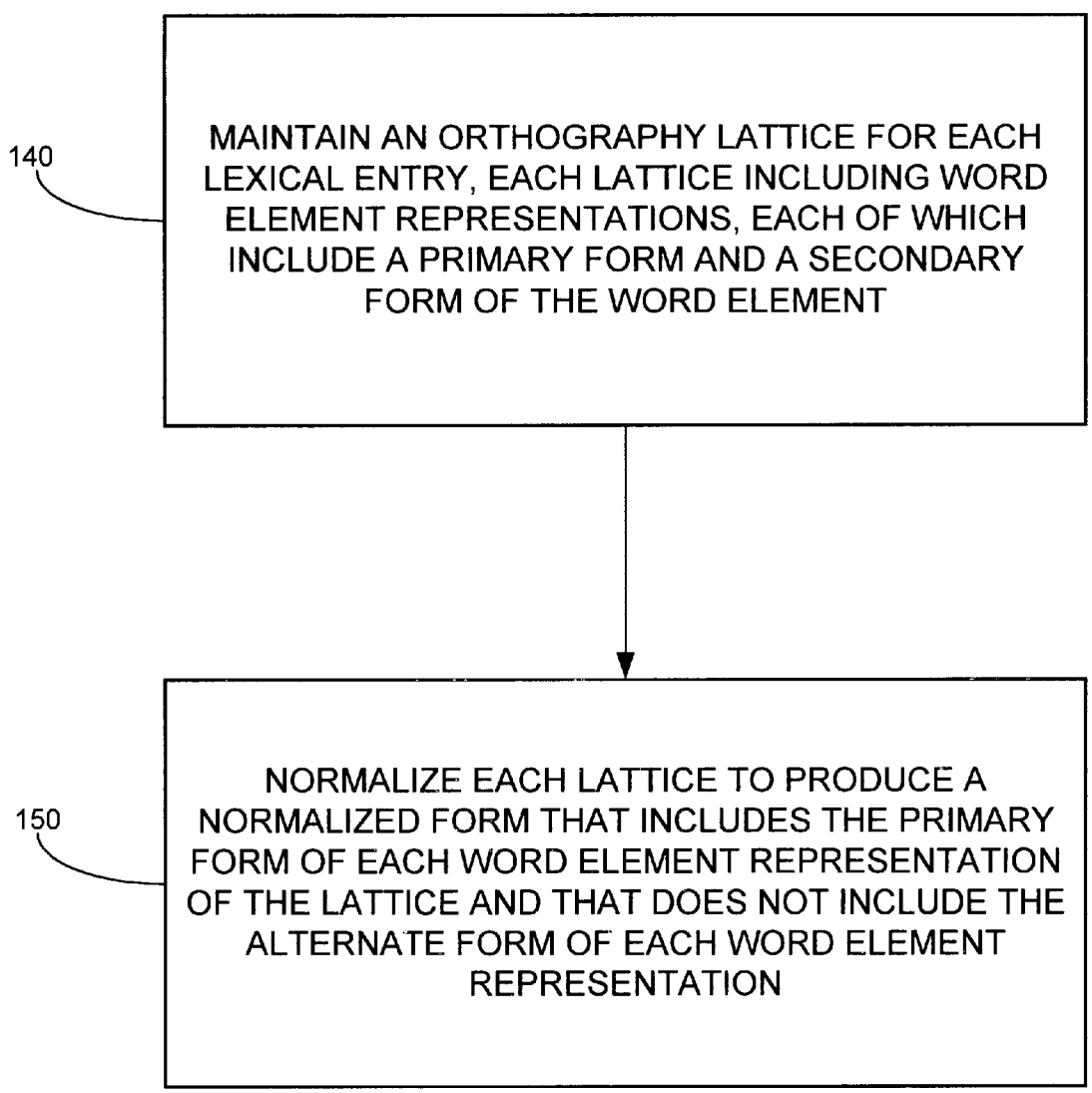
FIG. 3 is a flow chart representing a method of normalizing orthographic variations in the Japanese language according to an illustrative embodiment of the present invention.

In an illustrative embodiment of the present invention, when normalizing the entries, the primary part of each set of brackets (each multi-form subfield 102, 104, 106) in the lattice is used. Thus, the normalized form for the above lattice would be "WX", even if the surface form in the input text were "Wcd". FIG. 3 is a flow chart representing a method of normalizing orthographic variations in the Japanese language. At step 140, an orthography lattice 100 is maintained for each of a plurality of lexical entries. Each lattice 100 represents a plurality of orthographic forms of the lexical entry and includes at least one word-element representation 102, 104, 106 representing a plurality of forms of a word element of the lexical entry. Each word element representation 102, 104, 106 includes a primary form 108 of the word element and an alternate form 110 of the word element. At step 150, each lattice 100 is normalized to produce a normalized form that includes the primary form 108 of each word-element representation 102, 104, 106 of the lattice 100 and that does not include the alternate form 110 of each word-element representation.

In the embodiment of the present invention wherein each lattice 100 is adapted to include an alternate-orthography-only word element comprising only alternate orthography characters; the normalized form comprises the primary form 108 of each word-element representation 102, 104, 106 and any alternate-orthography-only word elements that are present in the lattice 100. Thus, in an illustrative embodiment, the normalized form of [X:ta]beru is Xberu.

Recall that in one embodiment of the present invention, each word-element representation 102, 104, 106 is adapted to include an optional word part (not shown), or okurigana, that may optionally be used in conjunction with the primary form. Thus, in one embodiment, the lattice [W:a,b][X:c] would allow the following orthographies: "WX", "WbX", "Wc" and "Wbc". In this embodiment, the normalized form comprises the primary form of each word-element representation 102, 104, 106 and any optional word parts corresponding to each primary form that are present in the word-element representation. Thus, the normalized form of the above example would be Some okurigana are very rare, and it would be confusing to have the normalized form include them. Yet it is still necessary to support them. Thus in an illustrative embodiment of the present invention, each word-element representation 102, 104, 106 is adapted to further comprise a rarity indicator (not shown) indicative of whether usage of the optional word part is relatively common or relatively rare. If the rarity indicator indicates that usage is relatively rare, the normalized form comprises the primary form of each word-element representation 102, 104, 106 alone, rather than including the optional word part. In an illustrative embodiment, a period is used; instead of a comma, to set off the optional part if the optional part is rarely used. For the lattice [W:a.b][X:c], the accepted orthographies would be the same as for [W:a,b][X:c] (given above), the normalized form would be "WX" (instead of "WbX"). This aspect of the invention simplifies matters for the lexicographer.

Figure 4:
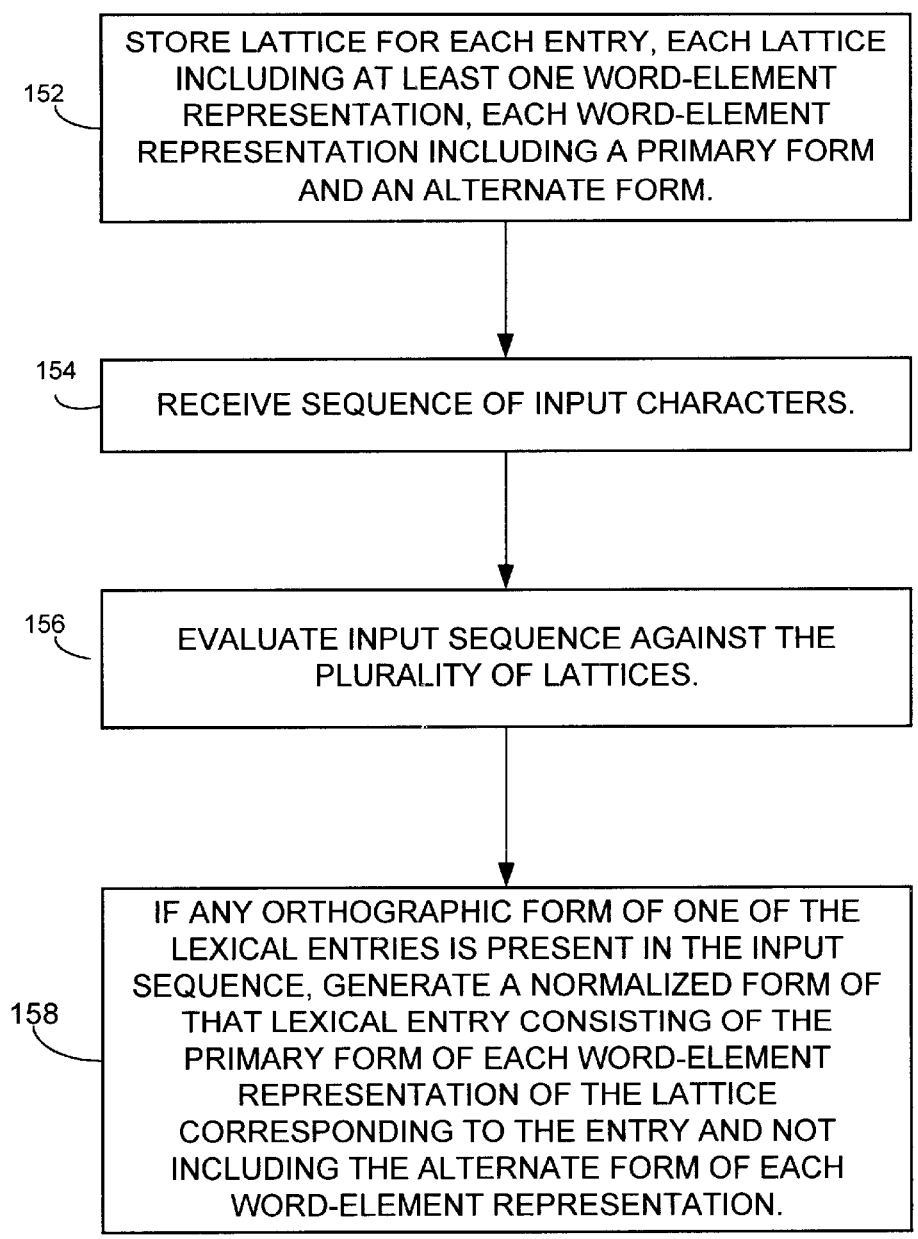
FIG. 4 is a flow chart representing a method of segmenting Japanese text according to an illustrative embodiment of the present invention.

In an illustrative embodiment of the present invention, the compiled lattice structures are used to generate a normalized representation of a lexical entry during segmentation analysis of a string of text. FIG. 4 is a block diagram representing a method of segmenting Japanese text using normalization of lexical entries according to an illustrative embodiment of the present invention. At step 152, an orthography lattice 100 is stored for each of a plurality of lexical entries. Each lattice 100 represents a plurality of orthographic forms of the lexical entry and includes at least one word-element representation 102, 104, 106 representing a plurality of forms of a word element of the lexical entry. Each word-element representation 102, 104, 106 includes a primary form 108 of the word element and an alternate form 110 of the word element. At step 154, a sequence of input characters is received. At step 156, the input sequence is evaluated against the plurality of lattices 100. At step 158, if any orthographic form of one of the lexical entries is present in the input sequence, a normalized form of that lexical entry is generated that comprises the primary form 108 of each word-element representation 102, 104, 106 of the lattice 100 corresponding to the entry and that does not include the alternate form 110 of each word-element representation 102, 104, 106. In an illustrative embodiment, other normalization techniques discussed hereinabove, such as those accounting for optional characters and all-alternate-orthography characters, are also employed with the method represented by FIG. 4. The generated normalized form is provided to downstream components of the word segmenter, such as the parser. As a result of this normalization of the lexical entry, the parser and other downstream components only have to deal with the particular surface form of the lexical entry represented by the normalized form.

Figure 5:
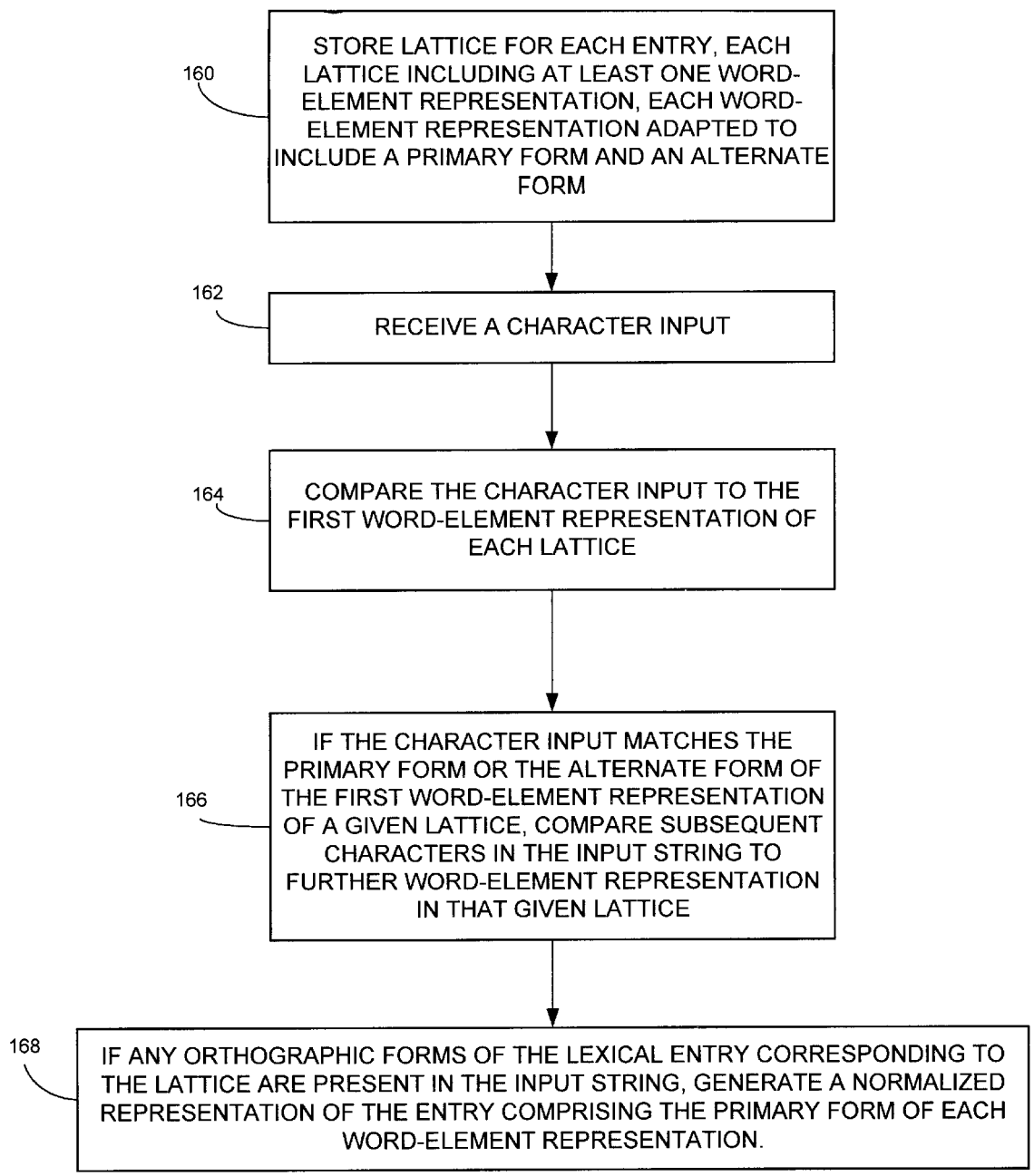
FIG. 5 is a flow chart representing a method of segmenting Japanese text according to an illustrative embodiment of the present invention.

Another embodiment of the present invention is directed to a method of segmenting Japanese text using the lattice provided above. Such a method is represented in the flow chart of FIG. 5. At step 160, an orthography lattice 100 is stored for each of a plurality of lexical entries. Each lattice 100 represents a plurality of orthographic forms of the lexical entry. Each lattice 100 includes at least one word-element representation 102, 104, 106. Each word-element representation 102, 104, 106 represents a plurality of different forms of the corresponding word element of the lexical entry. Each word-element representation 102, 104, 106 is adapted to include a primary form 108 of the word element and an alternate form 110 of the word element. It is noted that some word-element representations may not actually include a primary form, such as with word elements that have no kanji representations. Still, each word-element representation 102, 104, 106 is capable of including a primary form 108 of the word element. At step 162, a character input that is part of an input string is received. At step 164, the received character input is compared to the first word-element representation 102 of each lattice 100.

At step 166, if the received character input matches either the primary form 108 or the alternate form 110 of the first word-element representation 102 of a particular lattice I 00, the subsequent characters in the input string are compared to further word-element representations 104, 106 in the particular lattice 100 in order to ascertain whether any orthographic forms of the lexical entry corresponding to the particular lattice 100 are present in the input string beginning with the received character input. In an illustrative aspect of this embodiment of the invention, at step 168, if any orthographic forms of the lexical entry corresponding to the particular lattice are present in the input string beginning with the received character input, a normalized representation of the lexical entry is generated which includes the primary form of each word-element representation of the lattice and that does not include the alternate form of each word-element representation. In an illustrative embodiment, other normalization techniques discussed hereinabove, such as those accounting for optional characters and all-alternate-orthography characters, are also employed with the normalization technique represented by step 168. The generated normalized form is provided to downstream components of the word segmenter, such as the parser.

Figure 6:
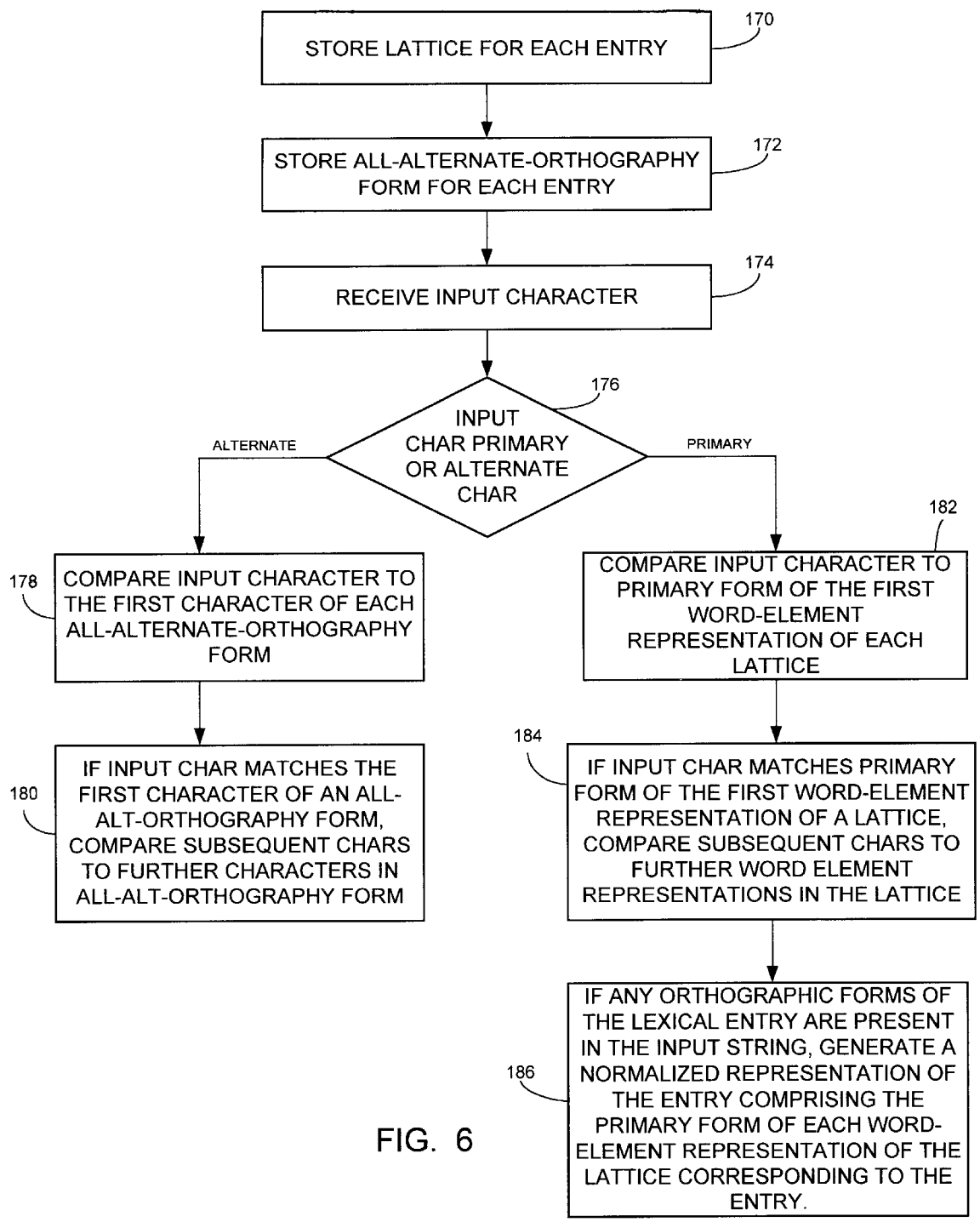
FIG. 6 is a flow chart representing a method of segmenting Japanese text according to an illustrative embodiment of the present invention.

Another illustrative method of segmenting Japanese text using the lattice 100 provided herein is represented in the flow chart of FIG. 6. At step 170, an orthography lattice 100 is stored for each of a plurality of lexical entries. At step 172, an all-alternate-orthography form is stored for each lexical entry. Each all-alternate-orthography form consists exclusively of alternate orthography characters and does not contain any primary orthography characters. At step 174, an input character that is part of an input string of characters is received. At step 176, it is determined whether the received input character is a primary orthography character or an alternate orthography character. If the received input character is an alternate orthography character, the input character is compared to the first character of each stored all-alternate-orthography form, as shown at step 178. Then, at step 180, if the input character matches the first character of a particular all-alternate-orthography form, subsequent characters in the input string are compared to further characters in the particular all-alternate-orthography form. In this way, it is ascertained whether the all-alternate-orthography form of the corresponding lexical entry is present in the input string beginning with the received input character.

If, on the other hand, the result of the query of step 176 is that the received input character is a primary orthography character, the input character is compared to the primary form 108 of the first word-element representation 102 of each lattice 100, as shown at step 182. Then, if the received input character matches the primary form 108 of the first word-element representation 102 of a particular lattice 100, subsequent characters in the input string are compared to further word-element representations 104, 106 in the particular lattice 100, as shown at step 184. The subsequent characters are compared to both the primary 108 and alternate forms 110 of the further word-element representations 104, 106 in the particular lattice 100. It is thereby ascertained whether any orthographic forms of the lexical entry corresponding to the particular lattice 100 are present in the input string beginning with the received input character.

In an illustrative aspect of the method represented by FIG. 6, after step 184, if any orthographic forms of the lexical entry corresponding to the particular lattice are present in the input string beginning with the received input character, a normalized representation of the lexical entry is generated which includes the primary form of each word-element representation of the lattice and that does not include the alternate form of each word-element representation, as shown at step 186. In an illustrative embodiment, other normalization techniques discussed hereinabove, such as those accounting for optional characters and all-alternate-orthography characters, are also employed with the normalization technique represented by step 186. The generated normalized form is provided to downstream components of the word segmenter, such as the parser.

Figure 7:
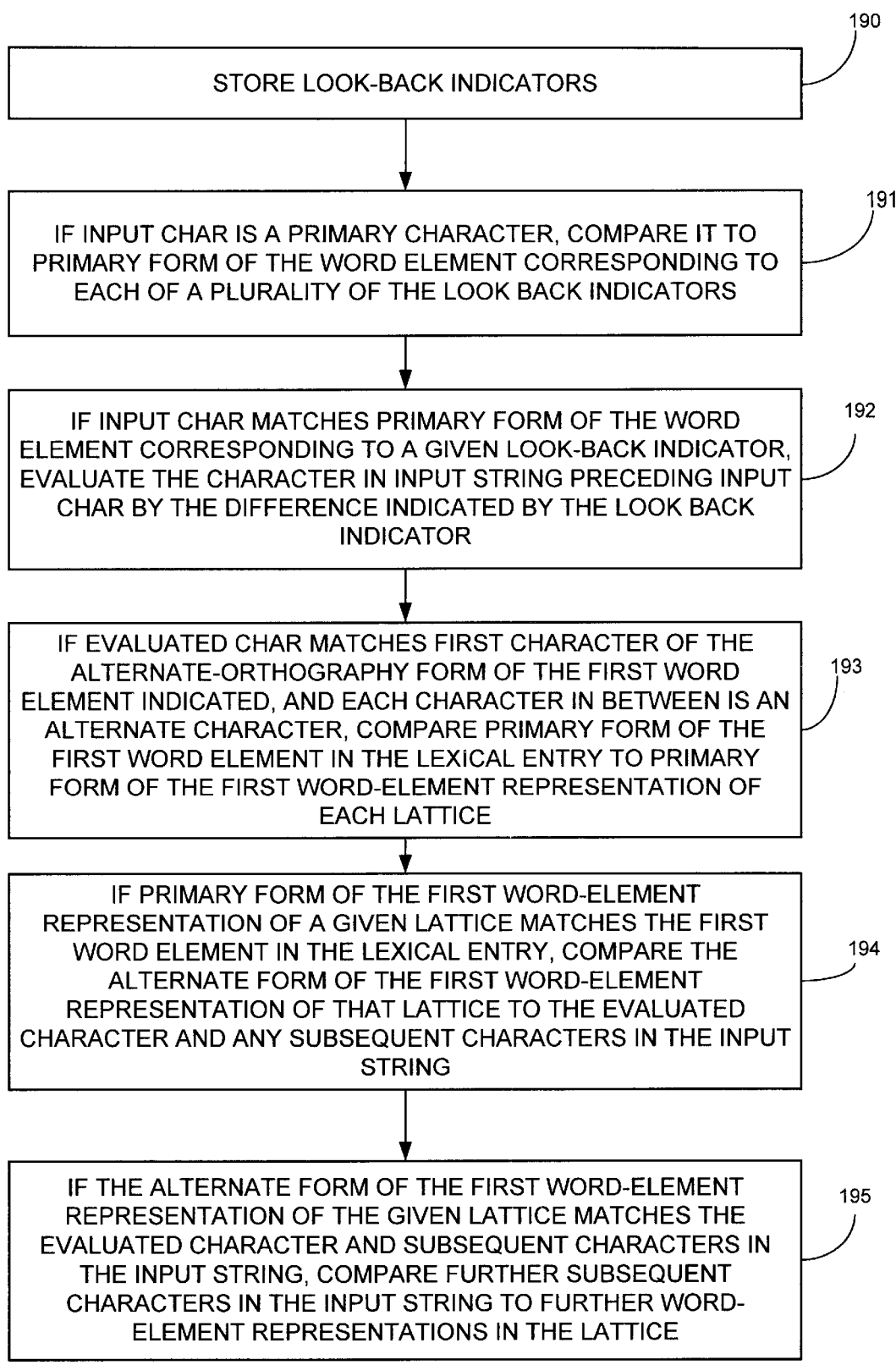
FIG. 7 is a flow chart representing a method of segmenting Japanese text according to an illustrative embodiment of the present invention.

In an illustrative embodiment of the present invention, the method of segmenting Japanese text represented in the flow chart of FIG. 6 is extended to include the steps represented in the flow chart of FIG. 7. At step 190, for each lexical entry that contains two or more word elements, a look-back indicator is stored for each word element in the lexical entry, other than the first word element, that contains a primary/alternate orthography pair. Each look-back indicator includes data that indicates the primary form of the corresponding word element, the primary form of the first word element in the lexical entry, and the first character of an alternate-orthography form of the first word element in the lexical entry. Each look-back indicator also indicates the difference in character position between the corresponding word element and the first character of the alternate-orthography form of the first word element in the lexical entry when all of the word elements occurring before the corresponding word element in the corresponding lexical entry are alternate form word elements.

For example, for a lexical item that has a lattice of [V:bc][W:de], a look-back indicator would be stored for the word element [W:de]. This look-back indicator would include data indicating the primary form (W) of the corresponding word element, the primary form (V) of the first word element in the lexical entry, and the first character (b) of the alternate form of the first word element in the lexical entry. The look-back indicator would also indicate the difference in character position between the corresponding word element [W:de] and the first character (b) of the alternate form (be) of the first word element in the lexical entry when all of the word elements occurring before the corresponding word element [W:de] in the corresponding lexical entry are alternate form word elements. In this example, when all of the characters occurring before the word element [W:de] are alternate orthography characters (be), the difference in character position between word element [W:de] and the "b" of the alternate form of the first word element is two. Thus if the lexical entry [V:bc][W:de] were present in an input string in a form wherein all of the characters preceding [W:de] were alternate orthography characters, and one were to "look back" two characters from the word element [W:de], one would arrive at the character "b". Thus the difference indicated by the look-back indicator would be two (2).

As another example, take the lattice a[W:bc][X:de]. The look-back indicator for the word-element [W:bc] would indicate the primary form of the corresponding word element, which is W. The look-back indicator would also indicate the primary form of the first word element in the lexical entry. Because the first word element of the entry is simply "a", with no primary-orthography equivalents, "a" is the primary form of that word element. Therefore, the look back indicator would indicate "a" as the primary form of the first word element in the lexical entry. The [W:bc] look-back indicator would also indicate the first character of an alternate-orthography form of the first word element in the lexical entry. The alternate-orthography form of the word-element, "a", is "a". Therefore, the look-back indicator would indicate that the first character of the alternate-orthography form of the first word element in the lexical entry is simply "a". The [W:bc] look-back indicator would also indicate the difference in character position between the corresponding word element [W:bc] and the first character (a) of the alternate-orthography form (also a) of the first word element (also a) in the lexical entry when all of the word elements occurring before the corresponding word element in the corresponding lexical entry are alternate form word elements. In this example said difference is 1.

At step 191, if the result of the query of step 176 of FIG. 6 is that the received input character is a primary orthography character, the input character is compared to the primary form of the word element corresponding to each of a plurality of look-back indicators. In an illustrative embodiment, step 191 employs an intelligent search so that it is not necessary to compare the input character to the primary form of the word element corresponding to each and every look-back indicator. If the received input character matches the primary form of the word element corresponding to a particular look-back indicator, steps 192–195 are performed. At step 192, the character in the input string that precedes the received input character by the difference indicated by the look-back indicator is evaluated. At step 193, if the evaluated character matches the first character of the alternate form of the first word element indicated by the look-back indicator, and each character between the received input character and the evaluated character in the input string is an alternate orthography character, the primary form of the first word element in the lexical entry, as indicated by the look-back indicator, is compared to the primary form 108 of the first word-element representation 102 of each lattice 100. At step 194, if the primary form of the first word element in the lexical entry, as indicated by the look-back indicator, matches the primary form 108 of the first word-element representation 102 of a particular lattice 100, the alternate form 110 of the first word-element representation 102 of the particular lattice 100 is compared to the evaluated character and subsequent characters in the input string.

At step 195, if the alternate form 110 of the first word-element representation 102 of the particular lattice 100 matches the evaluated character and subsequent characters in the input string, further subsequent characters in the input string are compared to further word-element representations 104, 106 in the particular lattice 100. The further subsequent characters are compared to both the primary 108 and alternate forms 110 of the further word-element representations 104, 106 in the particular lattice 100. The subsequent characters are compared to both the primary 108 and alternate forms 110 of the further word-element representations 104, 106 in the particular lattice 100. In this way, it is determined whether any orthographic forms of the lexical entry corresponding to the particular lattice 100 are present in the input string beginning with the evaluated character. In an illustrative aspect of this embodiment of the invention, if any orthographic forms of the lexical entry corresponding to the particular lattice are present in the input string beginning with the received evaluated character, a normalized representation of the lexical entry is generated which includes the primary form of each word-element representation of the lattice and that does not include the alternate form of each word-element representation. In an illustrative embodiment, other normalization techniques discussed hereinabove, such as those accounting for optional characters and all-alternate-orthography characters, are also employed to generate the normalized form. The generated normalized form is provided to downstream components of the word segmenter, such as the parser.

In an illustrative embodiment of the procedure represented by FIG. 7, a look-back indicator for a word element whose primary orthographic form comprises more than one character indicates the first character of the primary form of the corresponding word element. The input character is compared to the first character of the primary form of the word element corresponding to each of the look-back indicators, as indicated by the look-back indicator. If the received input character matches the first character of the primary form of the word element corresponding to a particular look-back indicator, characters subsequent to the input character in the input string are compared to the non-initial characters of the primary form of the word element corresponding to the particular look-back indicator. Steps 192–195 of FIG. 7 are performed if and only if the characters subsequent to the input character match the non-initial characters of the primary form of the word element corresponding to the particular look-back indicator. For example, the lexical entry [V:a][WX:bc] will have a look-back indicator that indicates W, the first character of the primary form of the word element [WX:bc], rather than WX, which is simply the primary form of the word element [WX:bc]. Thus if a W is received in the input string, the character subsequent to the W in the input string is compared to the character X. Steps 192–195 of FIG. 7 are performed with respect to [V:a][WX:bc] if and only if said subsequent character is an X.

In an illustrative implementation of the present invention, the lattice data is compiled into the following form:

(1) lattice entries for each primary orthography character. This is a list of all the lattices grouped based on the first primary orthographic character (usually a kanji character).

(2) a look-back indicator list for each primary-orthography character. This is a list of all the initial primary-orthography characters for words having a mixed-orthography form for which the indicated primary-orthography character is the first primary-orthography character occurring in the surface form.

When a primary-orthography character is encountered in the input string, (1) is used to process all of the possible lattices where this is the first primary-orthography character in the word. In addition, (2) is used to scan backward to look for the beginning of any mixed-orthography word where this character is the first primary-orthography character in the word (but not necessarily the first character in the word). This "backward" scanning implies a left-to-right analysis, and for simplicity's sake, the process will be described herein with reference to such a left-to-right analysis. However, the present invention also contemplates the implementation of the look-back indicators with respect to a right-to-left analysis.

The following example illustrates this implementation. Assume we have the following two lexical items:

[V:bc][W:de][X:fg]

[W:ae][X:fg][Y:hi]

Recall that the full kana forms are illustratively handled through a straightforward lexicon lookup. This example describes only the lattice lookup.

From these 2 lexical entries, the following lattice data is compiled:

V(1) [V:bc][W:de][X:fg]
   (2) -
W(1) [W:ae][X:fg][Y:hi]
   (2) V, –2, b
X(1) -
   (2) V, –4, b W, –2, a
Y(1) -
   (2) W, –4, a

If V is encountered in the input string, then the processing is straightforward. The lattice [V:bc][W:de][X:fg] is processed. This lattice may be processed in any suitable manner. In one illustrative embodiment, a trie of lattices is compiled and used for processing the lattice. The processing of the lattice finds all forms of [V:bc][W:de][X:fg] that begin with V: VWX, VWfg, VdeX, Vdefg. There is no look-up indicator list (2) associated with the character V, so nothing further needs to be done if the character V is encountered.

If W is encountered in the input string, the [W:ae][X:fg][Y:hi] lattice is processed in the same manner described above. This detects: WVXY, WXhi, WfgY, Wfghi. Since there is a look-up indicator list (2) associated with the character W, the data in the list is used to look for additional forms. The "V, –2, b" data means go back 2 characters checking to make sure that each intervening character is an alternate-orthography character (kana character). If that character is "b", then go to primary orthography "V" and process lattices. This will detect: bcWX, bcWfg.

Similarly for X and Y:

X: "V, −4, b" will detect: bcdeX (Read as: go back 4 characters, and if you find a "b" then process "V" lattices).

X: "W, −2,a" will detect: aeXY, aeXhi.

Y: "W, −4, a" will detect: aefgY.

In this way, all possible primary-orthography and mixed-orthography forms are detected, accessing the (rather large) primary-orthography tables only when necessary.

Figure 8:
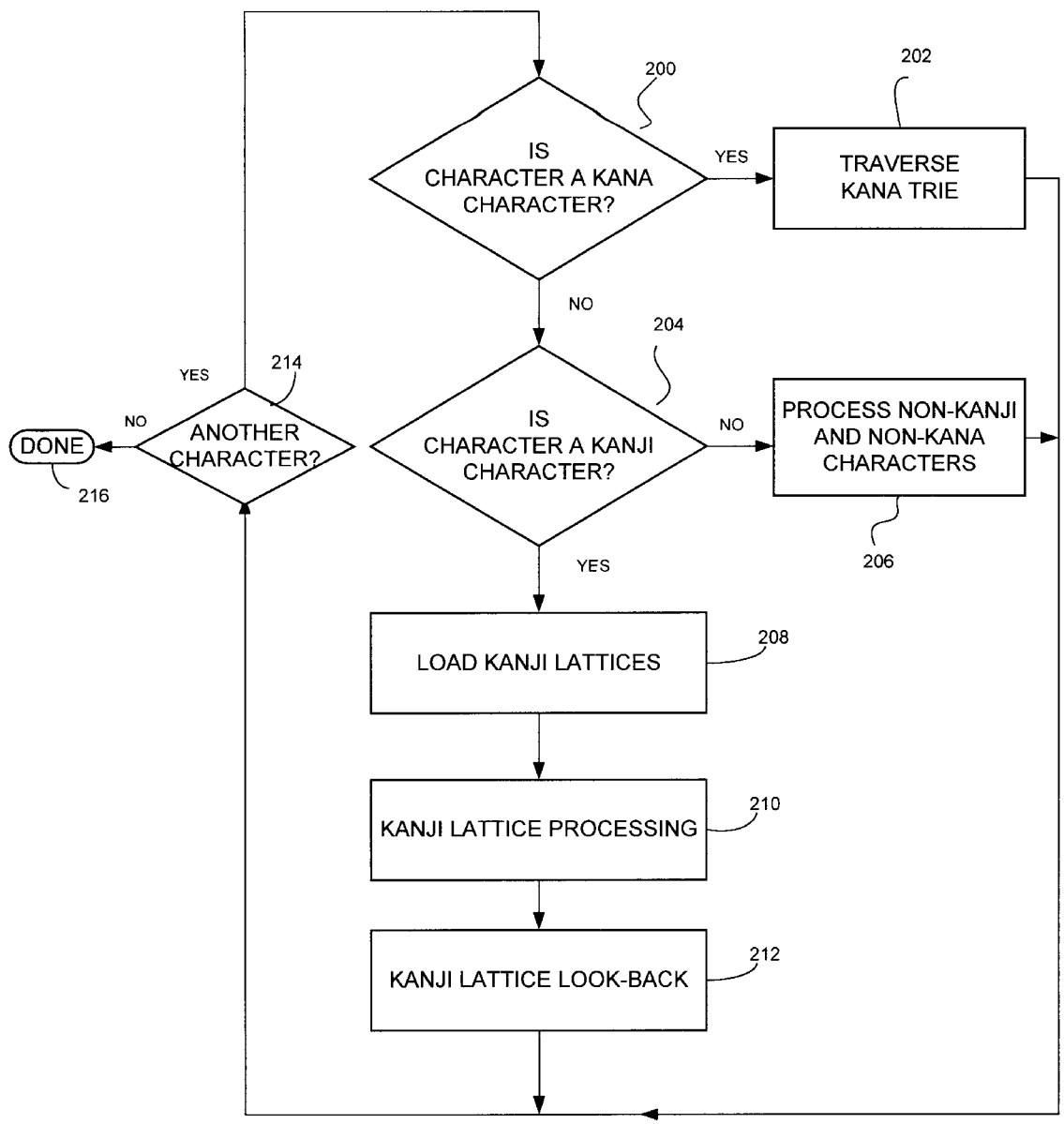
FIG. 8 is a flow chart representing a method of segmenting Japanese text according to an illustrative embodiment of the present invention.

FIG. 8 is a flow chart representing a method of segmenting Japanese text according to an illustrative embodiment of the present invention. In this illustrative flow chart, and in the following discussion, the primary characters are kanji characters and the alternate characters are kana characters. At step 200, it is determined whether the current input character being evaluated is an alternate-orthography character. In an illustrative embodiment, "alternate-orthography character" means a kana character. If the character is a kana character, subsequent characters in the input string are evaluated to find all possible all-kana words that can be formed from the input string, originating at the current character, as represented by step 202. In an illustrative embodiment, this is achieved by traversing a "kana trie," as is described more fully below with respect to FIG. 9. If the current character is not a kana character, it is determined whether it is a primary-orthography character, as shown at step 204. In an illustrative embodiment, "primary-orthography character" means a kanji character, but it may also refer to other characters such as symbols. While FIGS. 8–11 and the corresponding discussion refer to "kanji" characters, it is to be understood that this discussion also pertains to non-kanji primary-orthography characters.

If the character evaluated at step 204 is not a kanji character, it may be a roman character, a parenthesis or an invalid character. Parentheses are sometimes used in Japanese to indicate pronunciation. Processing of roman characters, parentheses and invalid characters is shown generally at step 206. If it is determined at step 204 that the current character is a kanji character, a set of kanji lattices 100 that contain the kanji character is loaded, as represented at step 208. Then subsequent characters in the input string are evaluated against the loaded lattices to find all possible words that can be formed from the input string, originating at the current kanji character, as represented by step 210. Then, at step 212, characters preceding the current kanji character in the input string are evaluated against the loaded lattices to find all possible words that can be formed from the input string and that include the current kanji character as the first kanji character in the word, but not as the first character in the word overall. After each of steps 202, 206 and 212, process flow proceeds to step 214, at which it is determined whether there is another character in the input string. If there is, process flow returns to step 200, where the next character is considered. If there are no more characters to be evaluated, the segmentation process is complete, as shown at step 216.

Figure 9:
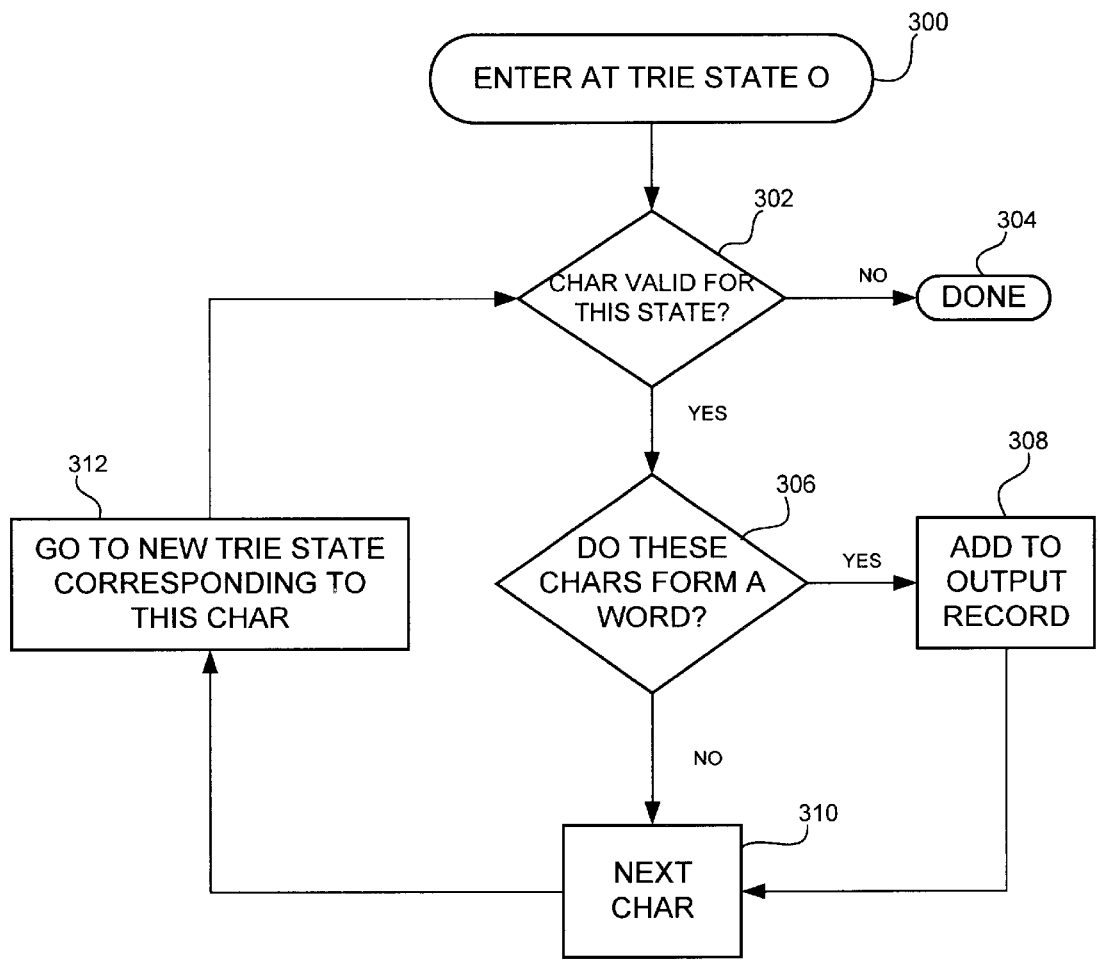
FIG. 9 is a flow chart representing an illustrative method of evaluating characters that follow a given character in the input string according to the present invention.

FIG. 9 is a flowchart representing an illustrative process of traversing a kana trie, as is shown generally at step 202 of FIG. 8. A trie is a branching chart which starts with one primary character and proceeds to represent all character combinations following from the primary character which form valid words. The kana trie described here includes only representations that include only kana characters. At step 300 of FIG. 9, the current kana character is received and the process of traversing the kana trie begins at trie state 0. At step 302, it is determined whether the current character is valid for the current state in the trie, that is, whether any words in the lexicon contain the current combination of characters at the beginning of the word. If the character is not valid, the process of traversing the kana trie is complete, as shown at step 304. At step 306, it is determined whether the current combination of characters forms a complete word. In the first pass through the cycle, the "current combination" consists only of the current kana character by itself. If the current combination of characters does indeed form a word, that word is added to the output record, as shown at step 308, and process flow continues to step 310. If the current combination of characters does not form a word, process flow proceeds directly to step 310. At step 310, the next character in the input string is added to the current combination of characters, forming a new current combination of characters. After the new character is received, the current state of the trie is changed to go to the state corresponding to the new input character, as shown at step 312. Then process control returns to step 302, where it is determined whether the current character is valid for the current state in the trie. It will be noted that if the new character is a kanji character, the traversing of the kana trie ends. As shown in FIG. 8, process control then proceeds to step 214, at which the next character in the input string is considered.

FIG. 9 can also be used to represent an illustrative method of evaluating characters that follow the current character in the input string against the loaded lattices to find all possible words that can be formed from the input string, originating at the current kanji character, as represented by step 210 in FIG. 8. This illustrative embodiment employs a trie of lattices. At step 300 of FIG. 9, the current kanji character is received and the process of traversing the trie of lattices begins at trie state 0. At step 302, it is determined whether the current character is valid for the current state in the. If the character is not valid, the process of traversing the trie of lattices is complete, as shown at step 304. At step 306, it is determined whether the current combination of characters forms a complete word. In the first pass through the cycle, the "current combination" consists only of the current kanji character by itself. If the current combination of characters does indeed form a word, that word is added to the output record, as shown at step 308, and process flow continues to step 310. If the current combination of characters does not form a word, process flow proceeds directly to step 310. At step 310, the next character in the input string is added to the current combination of characters, forming a new current combination of characters. This next character can be either a kanji character or a kana character. After the new character is received, the process proceeds to a new trie state corresponding to the new character, as shown at step 312. Then process control returns to step 302, where it is determined whether the current character is valid for the current state in the trie.

Figure 10:
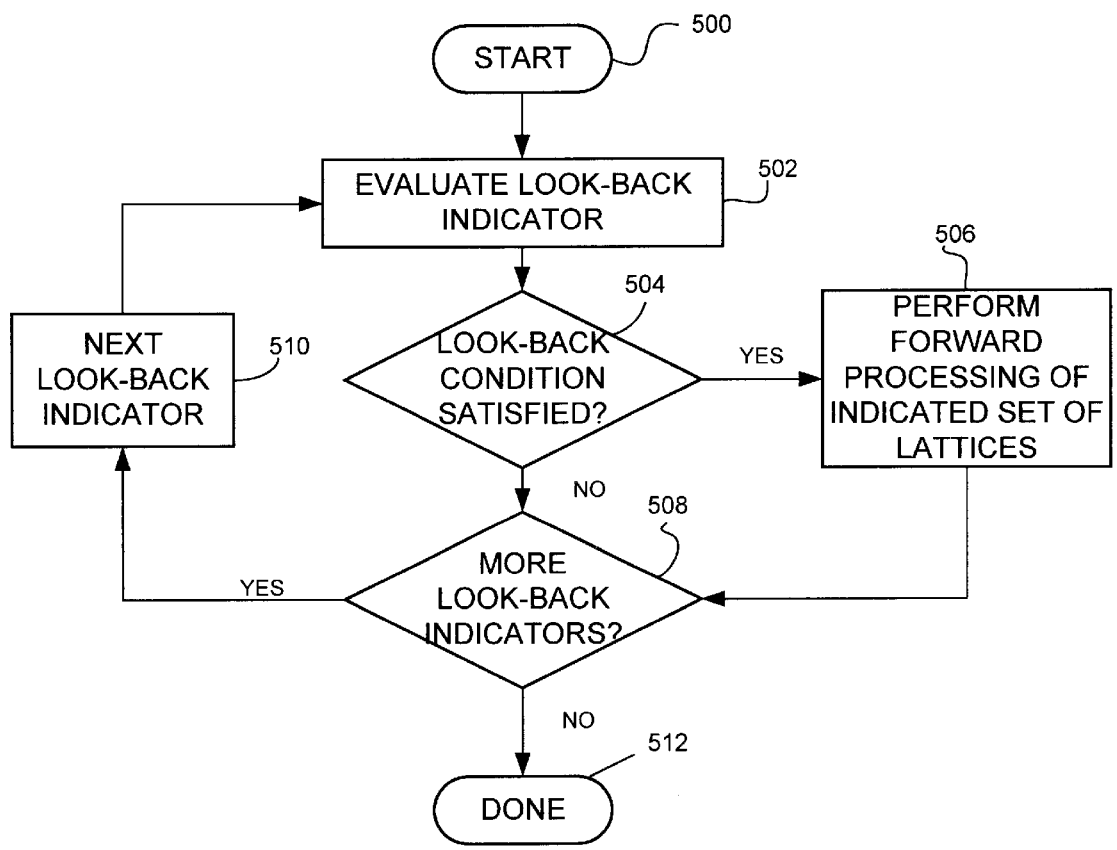
FIG. 10 is a flow chart representing an illustrative method of evaluating characters preceding a given kanji character in the input string, according to the present invention.

FIG. 10 is a flow chart representing a method of evaluating characters preceding the current kanji -character in the input string against the loaded lattices to find all possible words that can be formed from the input string and that include the current kanji character as the first kanji character in the word, but not as the first character in the word overall. This method employs the look-back indicator list described previously. At step 500 of FIG. 6, the current character is received and the process of evaluating the preceding characters begins. At step 502, the look-back indicator for the current kanji character is evaluated. Recall that each look-back indicator specifies that a character in the input string that sits in a position that is n characters to the left of the current kanji character is to be evaluated. Also recall that, although this aspect of the invention is described herein with respect to a left-to-right analysis, the invention also contemplates employing the methods in a left-to-right analysis. If the character in this position is the kana character specified by the look-back indicator, the lattices for the kanji character specified by the look-back indicator is processed in the forward direction. Thus, at step 504, it is determined whether the look-back condition is satisfied, that is, whether the kana character indicated by the look-back indicator is located n characters to the left of the current kanji character. If the look-back condition is satisfied, the set of lattices that correspond to the kanji character specified by the look-back indicator is processed in the forward direction, as shown at step 506. This processing is equivalent to the forward lattice processing described with respect to FIG. 5. If, at step 504, the look-back condition is not satisfied, it is determined whether there are more look-back indicators in the look-back indicator list for the current kanji character, as shown at step 508. Likewise, if the look-back condition is satisfied at step 504, after performing the forward lattice processing of step 506, it is determined whether there are more look-back indicators in the look-back indicator list for the current kanji, as shown at step 506. If there are more look-back indicators in the list, the next indicator is then evaluated, as indicated by steps 510 and 502. If, on the other hand, there are no more look-back indicators in the list, the backward lattice processing for the current character is complete, as indicated at step 512.

Other embodiments of the present invention are directed to computer-readable media having computer-executable instructions for performing the methods described hereinabove. Illustrative computer-readable media for storing these instructions include hard disk drive 57, removable magnetic disk 59, optical disk 51, ROM 54 and RAM 55, as shown in FIG. 1.

In summary, one embodiment of the present invention is directed to a computer-readable medium having stored thereon a data structure that includes multiple data fields collectively representing a Japanese lexical entry. The multiple data fields include a plurality of multi-form data fields 102, 104, 106. Each multi-form data field 102, 104, 106 is capable of holding data representing a word element of the lexical entry. Each multi-form data field includes two subfields. The first subfield 108 contains data representing a primary form of the corresponding word element. The second subfield 110 contains data representing an alternate form of the corresponding word element.

In an illustrative embodiment of the invention the data structure includes a lattice of the form:

[W:ab][X:c] . . . [Y:def]

where W, X and Y each represent a primary-orthography character; a, b, c, d, e, and f each represent an alternate orthography character; ab, c, and def represent an alternate representation to W, X and Y, respectively; and the lattice as a whole represents a plurality of orthographic forms of the lexical entry.

Another embodiment of the present invention is directed to a method of normalizing orthographic variations in the Japanese language. According to this method, an orthography lattice 100 is maintained for each of multiple lexical entries. Each lattice 100 represents a plurality of orthographic forms of the lexical entry and includes at least one word-element representation 102, 104, 106 representing multiple forms of a word element-of the lexical entry. Each word-element representation 102, 104, 106 includes a primary form 108 of the word element and an alternate form 110 of the word element. Each lattice 100 is normalized to produce a normalized form that includes the primary form 108 of each word element representation 102, 104, 106 of the lattice 100 and that does not include the alternate form 110 of each word element representation.

Another embodiment of the present invention is directed to a method of segmenting Japanese text. According to the method, an orthography lattice 100 is stored for each of multiple lexical entries. Each lattice 100 represents a plurality of orthographic forms of the lexical entry and includes at least one word-element representation 102, 104, 106 representing a plurality of forms of a word element of the lexical entry. Each word-element representation 102, 104, 106 includes a primary form 108 of the word element and an alternate form 110 of the word element. A sequence of input characters is received and the input sequence is evaluated against the plurality of lattices 100. If any orthographic form of one of the lexical entries is present in the input sequence, a normalized form of that lexical entry is generated that comprises the primary form 108 of each word-element representation 102, 104, 106 of the lattice 100 corresponding to the entry and that does not include the alternate form 110 of each word-element representation 102, 104, 106.

Another embodiment of the present invention is directed toga another method of segmenting Japanese text. According to the method, an orthography lattice 100 is stored for each of multiple lexical entries. Each lattice 100 represents a plurality of orthographic forms of the lexical entry. Each lattice 100 includes at least one word-element representation 102, 104, 106. Each word-element representation 102, 104, 106 represents multiple different forms of the corresponding word element of the lexical entry. Each word-element representation 102, 104, 106 can include a primary form 108 of the word element and an alternate form 110 of the word element. A character input that is part of an input string is received. The received character input is compared to the first word-element representation 102 of each lattice 100. If the received character input matches either the primary form 108 or the alternate form 110 of the first word-element representation 102 of a particular lattice 100, the subsequent characters in the input string are compared to further word-element representations 104, 106 in the particular lattice 100 in order to ascertain whether any orthographic forms of the lexical entry corresponding to the particular lattice 100 are present in the input string beginning with the received character input. In an illustrative aspect of this embodiment of the invention, if any orthographic forms of the lexical entry corresponding to the particular lattice. 100 are present in the input string beginning with the received character input, a normalized representation of the lexical entry is generated which includes the primary form 108 of each word-element representation 102, 104, 106 of the lattice and that does not include the alternate form 110 of each word-element representation 102, 104, 106.

Another embodiment of the present invention is directed to still another method of segmenting Japanese text. According to this method, an orthography lattice 100 is stored for each of a plurality of lexical entries. An all-alternate-orthography form is also stored for each lexical entry. Each all-alternate-orthography form consists exclusively of alternate orthography characters and does not contain any primary orthography characters. An input character that is part of an input string of characters is received. It is determined whether the received input character is a primary orthography character or an alternate orthography character. If the received input character is an alternate orthography character, the input character is compared to the first character of each stored all-alternate-orthography form. Then, if the input character matches the first character of a particular all-alternate-orthography form, subsequent characters in the input string are compared to further characters in the particular all-alternate-orthography form. In this way, it is ascertained whether the all-alternate-orthography form of the corresponding lexical entry is present in the input string beginning with the received input character. If, on the other hand, the received input character is a primary orthography character, the input character is compared to the primary form 108 of the first word-element representation 102 of each lattice 100. Then, if the received input character matches the primary form 108 of the first word-element representation 102 of a particular lattice 100, subsequent characters in the input string are compared to further word-element representations 104, 106 in the particular lattice 100, thereby ascertaining whether any orthographic forms of the lexical entry corresponding to the particular lattice 100 are present in the input string beginning with the received input character. In an illustrative aspect of this embodiment of the invention, if any orthographic forms of the lexical entry corresponding to the particular lattice 100 are present in the input string beginning with the received input character, a normalized representation of the lexical entry is generated which includes the primary form 108 of each word-element representation 102, 104, 106 of the lattice 100 corresponding to the entry and that does not include the alternate form 110 of each word-element representation 102, 104, 106.

In an illustrative embodiment of the above method, for each lexical entry that contains two or more word elements, a look-back indicator is stored for each non-initial word element in the lexical that contains a primary/alternate orthography pair. Each look-back indicator includes data that indicates the primary form of the corresponding word element, the primary form of the first word element in the lexical entry, and the first character of an alternate-orthography form of the first word element in the lexical entry. Each look-back indicator also indicates the difference in character position between the corresponding word element and the first character of the alternate-orthography form of the first word element in the lexical entry when all of the word elements occurring before the corresponding word element in the corresponding lexical entry are alternate form word elements.

If the received input character is a primary-orthography character, the input character is compared to the primary form of the word element corresponding to each of a plurality of look-back indicators. If the received input character matches the primary form of the word element corresponding to a particular look-back indicator, the character in the input string that precedes the received input character by the difference indicated by the look-back indicator is evaluated. If the evaluated character matches the first character of the alternate-orthography form of the first word element indicated by the look-back indicator, and each character between the received input character and the evaluated character in the input string is an alternate orthography character, the primary form of the first word element in the lexical entry, as indicated by the look-back indicator, is compared to the primary form 108 of the first word-element representation 102 of each lattice 100. If the primary form of the first word element in the lexical entry, as indicated by the look-back indicator, matches the primary form 108 of the first word-element representation 102 of a particular lattice 100, the alternate form 110 of the first word-element representation 102 of the particular lattice 100 is compared to the evaluated character and subsequent characters in the input string. If the alternate form 110 of the first word-element representation 102 of the particular lattice 100 matches the evaluated character and subsequent characters in the input string, further subsequent characters in the input string are compared to further word-element representations 104, 106 in the particular lattice 100. In this way, it is determined whether any orthographic forms of the lexical entry corresponding to the particular lattice 100 are present in the input string beginning with the evaluated character. In an illustrative aspect of this embodiment of the invention, if any orthographic forms of the lexical entry corresponding to the particular lattice 100 are present in the input string beginning with the evaluated character, a normalized representation of the lexical entry is generated which includes the primary form 108 of each word-element representation 102, 104, 106 of the lattice and that does not include the alternate form 110 of each word-element representation 102, 104, 106.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed.

What is claimed is:

1. A computer-readable medium having computer-executable instructions stored thereon a data structure comprising:

a plurality of data fields collectively representing a Japanese lexical entry, the plurality of data fields comprising a plurality of multi-form data fields, each multi-form data field adapted to hold data representing a word element of the lexical entry, each multi-form data field comprising:

a first subfield adapted to hold data representing a primary form of a corresponding word element; and a second subfield adapted to hold data representing an alternate form of the corresponding word element, wherein the primary and alternate forms are different representations of the same corresponding word element.

2. The computer-readable medium of claim 1 wherein the first subfield is adapted to hold data representing a kanji form of the corresponding word element and the second subfield is adapted to hold data representing a kana form of the corresponding word element.

3. The computer-readable medium of claim 1 wherein the plurality of data fields further comprises an alternate-orthography-only data field adapted to hold data representing a word element that always consists exclusively of alternate orthography characters.

4. The computer-readable medium of claim 1 wherein each multi-form data field further comprises a third subfield adapted to hold data representing an optional word part that may optionally be used in conjunction with the primary form held in the first subfield.

5. The method of claim 4 wherein the optional word part comprises okurigana characters.

6. The computer-readable medium of claim 4 wherein each multi-form data field further comprises a fourth subfield adapted to hold data representing a rarity indicator indicative of whether usage of an optional word part held in the third subfield is relatively common or relatively rare.

7. The computer-readable medium of claim 1 wherein each multi-form data field further comprises a third subfield adapted to hold data representing an invalidity indicator that indicates that the alternate form held in the second subfield is an invalid form of the corresponding word element.

8. A computer-readable medium having computer-executable instructions stored thereon a data structure for representing a plurality of orthographic forms of a Japanese lexical entry, the data structure comprising:

a lattice of the form:

[W:ab][X:c] . . . [Y:def]

where W, X and Y each represent a primary-orthography character;

a, b, c, d, e, and f each represent an alternate orthography character; and W are different representations of a same word element; c and X are different representations of a same word element; def and Y are different representations of a same word element; and the lattice as a whole represents a plurality of orthographic forms of the lexical entry.

9. The computer-readable medium of claim 8 wherein W, X and Y each represent a kanji character and wherein a, b, c, d, e, and f each represent a kana character.

10. A method for normalizing orthographic variations in the Japanese language, comprising:

maintaining an orthography lattice for each of a plurality of lexical entries, each lattice representing a plurality of orthographic forms of the lexical entry and comprising at least one word-element representation representing a plurality of forms of a word element of the lexical entry, each word-element representation comprising a primary form of the word element and an alternate form of the word element, the primary and alternate forms being different representations of the same corresponding word-element; and normalizing each lattice to produce a normalized form that comprises the primary form of each word-element representation of the lattice and that does not include the alternate form of each word-element representation.

11. The method of claim 10 wherein the primary form of each word-element representation comprises a kanji character and the alternate form of each word-element representation comprises at least one kana character.

12. The method of claim 10 wherein each word-element representation is adapted to further comprise an optional word part that may optionally be used in conjunction with the primary form and wherein the normalized form comprises the primary form of each word-element representation and any optional word parts corresponding to each primary form that are present in the word-element representation.

13. The method of claim 12 wherein the optional word part comprises okurigana characters.

14. The method of claim 10 wherein each word-element representation is adapted to further comprise an optional word part that may optionally be used in conjunction with the primary form and to-further comprise a rarity indicator indicative of whether usage of such an optional word part is relatively common or relatively rare, and wherein, if the rarity indicator indicates that usage is relatively common, the normalized form comprises the primary form of each word-element representation and any optional word parts corresponding to each primary form that are present in the word-element representation, whereas, if the rarity indicator indicates that usage is relatively rare, the normalized form comprises the primary form of each word-element representation alone.

15. The method of claim 14 wherein the optional word part comprises okurigana characters.

16. The method of claim 10 wherein each lattice is adapted to further comprise an alternate-orthography-only word element comprising only alternate orthography characters and wherein the normalized form comprises the primary form of each word-element representation and any alternate-orthography-only word elements that are present in the lattice.

17. A method of segmenting Japanese text, comprising:

storing an orthography lattice for each of a plurality of lexical entries, each lattice representing a plurality of orthographic forms of the lexical entry and comprising at least one word-element representation, each word-element representation representing one or more forms of a word element of the lexical entry, each word-element representation adapted to include a primary form of the word element and an alternate form of the word element, the primary and alternate forms being different representations of the same corresponding word element;

receiving a character input that is part of an input string of characters;

comparing the received character input to a first word-element representation of each lattice;

if the received character input matches a primary form or an alternate form of the first word-element representation of a particular lattice, comparing subsequent characters in the input string to further word-element representations in the particular lattice, thereby ascertaining whether any orthographic forms of the lexical entry corresponding to the particular lattice are present in the input string beginning with the received character input.

18. The method of claim 17 wherein the primary form of the word-element representations comprises a kanji character and the alternate form of the word-element representations comprises at least one kana character.

19. The method of claim 17 further comprising a step of:

if any orthographic forms of the lexical entry corresponding to the particular lattice are present in the input string beginning with the received character input, generating a normalized form of the lexical entry that comprises the primary form of each word-element representation of the lattice and that does not include the alternate form of each word-element representation.

20. The method of claim 19 wherein each word-element representation is adapted to further comprise an optional word part that may optionally be used in conjunction with the primary form and wherein the normalized form comprises the primary form of each word-element representation and any optional word parts corresponding to each primary form that are present in the word-element representation.

21. The method of claim 20 wherein the optional word part comprises okurigana characters.

22. The method of claim 19 wherein each word-element representation is adapted to further comprise an optional word part that may optionally be used in conjunction with the primary form and to further comprise a rarity indicator indicative of whether usage of such an optional word part is relatively common or relatively rare, and wherein, if the rarity indicator indicates that usage is relatively common, the normalized form comprises the primary form of each word-element representation and any optional word parts corresponding to each primary form that are present in the word-element representation, whereas, if the rarity indicator indicates that usage is relatively rare, the normalized form comprises the primary form of each word-element representation alone.

23. The method of claim 22 wherein the optional word part comprises okurigana characters.

24. The method of claim 19 wherein each lattice is adapted to further comprise an alternate-orthography-only word element comprising only alternate orthography characters and wherein the normalized form comprises the primary form of each word-element representation and any alternate-orthography-only word elements that are present in the lattice.

25. A method of segmenting Japanese text comprising:
   storing an orthography lattice for each of a plurality of lexical entries, each lattice representing a plurality of orthographic forms of the lexical entry and comprising at least one word-element representation, each word-element representation representing a plurality of forms of a word element of the lexical entry, each word-element representation adapted to include a primary form of the word element and an alternate form of the word element, the primary and alternate forms being different representations of the corresponding word element;
   storing an all-alternate-orthography form for each lexical entry, each all-alternate-orthography form consisting exclusively of alternate orthography characters and not containing any primary orthography characters;
   receiving an input character that is part of an input string of characters;
   if the received input character is an alternate orthography character, comparing the received input character to a first character of each all-alternate- orthography form;
   if the received input character matches the first character of a particular all-alternate-orthography form, comparing subsequent characters in the input string to further characters in the particular all-alternate-orthography form, thereby ascertaining whether the all-alternate-orthography form of the corresponding lexical entry is present in the input string beginning with the received input character;
   if the received input character is a primary orthography character, comparing the received input character to the primary form of the first word-element representation of each lattice; and
   if the received input character matches the primary form of the first word-element representation of a particular lattice, comparing subsequent characters in the input string to further word-element representations in the particular lattice, thereby ascertaining whether any orthographic forms of the lexical entry corresponding to the particular lattice are present in the input string beginning with the received input character.

26. The method of claim 25 wherein the primary form of each word-element representation comprises a kanji character and the alternate form of each word-element representation comprises at least one kana character.

27. The method of claim 25 further comprising a step of:
   if any orthographic forms of a lexical entry are present in the input string beginning with the received input character, generating a normalized form of the lexical entry that comprises the primary form of each word-element representation of the lattice corresponding to the entry and that does not include the alternate form of each word-element representation.

28. The method of claim 27 wherein each word-element representation is adapted to further comprise an optional word part that may optionally be used in conjunction with the primary form and wherein the normalized form comprises the primary form of each word-element representation and any optional word parts corresponding to each primary form that are present in the word-element representation.

29. The method of claim 28 wherein the optional word part comprises okurigana characters.

30. The method of claim 27 wherein each word-element representation is adapted to further comprise an optional word part that may optionally be used in conjunction with the primary form and to further comprise a rarity indicator indicative of whether usage of such an optional word part is relatively common or relatively rare, and wherein, if the rarity indicator indicates that usage is relatively common, the normalized form comprises the primary form of each word-element representation and any optional word parts corresponding to each primary form that are present in the word-element representation, whereas, if the rarity indicator indicates that usage is relatively rare, the normalized form comprises the primary form of each word-element representation alone.

31. The method of claim 30 wherein the optional word part comprises okurigana characters.

32. The method of claim 27 wherein each lattice is adapted to further comprise an alternate-orthography-only word element comprising only alternate orthography characters and wherein the normalized form comprises the primary form of each word-element representation and any alternate-orthography-only word elements that are present in the lattice.

33. The method of claim 25 further comprising:
   for each lexical entry that contains two or more word elements, storing a look-back indicator for each non-initial word element in the lexical entry that contains a primary/alternate orthography pair, each look-back indicator indicating the primary form of the corresponding word element, the primary form of the first word element in the lexical entry, a first character of an alternate-orthography form of the first word element in the lexical entry, and a difference in character position between the corresponding word element and the first character of the alternate-orthography form of the first word element in the lexical entry when all of the word elements occurring before the corresponding word element in the corresponding lexical entry are alternate form word elements;
   if the received input character is a primary-orthography character, comparing the input character to the primary form of the word element corresponding to each of a plurality of the look-back indicators;
   if the received input character matches the primary form of the word element corresponding to a particular look-back indicator, performing steps of:
      (a) evaluating a character in the input string that precedes the received input character by the difference indicated by the look-back indicator;
      (b) if the evaluated character matches the first character of the alternate-orthography form of the first word element indicated by the look-back indicator, and each character between the received input character and the evaluated character in the input string is an alternate orthography character, comparing the primary form of the first word element in the lexical entry, as indicated by the look-back indicator, to the primary form of the first word-element representation of each lattice;
      (c) if the primary form of the first word element in the lexical entry, as indicated by the look-back indicator, matches the primary form of the first word-element representation of a particular lattice, comparing the alternate form of the first word-element representation of the particular lattice to the evaluated character and subsequent characters in the input string; and (d) if the alternate form of the first word-element representation of the particular lattice matches the evaluated character and subsequent characters in the input string, comparing further subsequent characters in the input string to further word-element representations in the particular lattice, thereby ascertaining whether any orthographic forms of the lexical entry corresponding to the particular lattice are present in the input string beginning with the evaluated character.

34. The method of claim 33 wherein the primary form of each word-element representation comprises a kanji character and the alternate form of each word-element representation comprises at least one kana character.

35. The method of claim 33 wherein a look-back indicator for a word element whose primary orthographic form comprises more than one character indicates the first character of the primary form of the corresponding word element, and wherein comparing the input character to the primary form of the word element corresponding to each of a plurality of the look-back indicators comprises comparing the input character to the first character of the primary form of the corresponding word, as indicated by the look-back indicator, and wherein if the received input character matches the first character of the primary form of the word element corresponding to a particular look-back indicator, characters subsequent to the input character in the input string are compared to the non-initial characters of the primary form of the word element corresponding to the particular look-back indicator, and wherein steps (a)–(d) are performed if and only if the characters subsequent to the input character match the non-initial characters of the primary form of the word element corresponding to the particular look-back indicator.

36. The method of claim 33 further comprising a step of:
if any orthographic forms of the lexical entry corresponding to the particular lattice are present in the input string beginning with the evaluated character, generating a normalized form of the lexical entry that comprises the primary form of each word-element representation of the lattice and that does not include the alternate form of each word-element representation.

37. The method of claim 36 wherein each word-element representation is adapted to further comprise an optional word part that may optionally be used in conjunction with the primary form and wherein the normalized form comprises the primary form of each word-element representation and any optional word parts corresponding to each primary form that are present in the word-element representation.

38. The method of claim 37 wherein the optional word part comprises okurigana characters.

39. The method of claim 36 wherein each word-element representation is adapted to further comprise an optional word part that may optionally be used in conjunction with the primary form and to further comprise a rarity indicator indicative of whether usage of such an optional word part is relatively common or relatively rare, and wherein, if the rarity indicator indicates that usage is relatively common, the normalized form comprises the primary form of each word-element representation and any optional word parts corresponding to each primary form that are present in the word-element representation, whereas, if the rarity indicator indicates that usage is relatively rare, the normalized form comprises the primary form of each word-element representation alone.

40. The method of claim 39 wherein the optional word part comprises okurigana characters.

41. The method of claim 36 wherein each lattice is adapted to further comprise an alternate-orthography-only word element comprising only alternate orthography characters and wherein the normalized form comprises the primary form of each word-element representation and any alternate-orthography-only word elements that are present in the lattice.

42. A method of segmenting Japanese text, comprising:
storing an orthography lattice for each of a plurality of lexical entries, each lattice representing a plurality of orthographic forms of the lexical entry and comprising at least one word-element representation, each word-element representation representing a plurality of forms of a word element of the lexical entry and comprising a primary form of the word element and an alternate form of the word element, the primary and alternate forms being different representations of the same corresponding word element;
receiving a sequence of input characters;
evaluating the input sequence against the plurality of lattices;
if any orthographic form of one of the lexical entries is present in the input sequence, generating a normalized form of said lexical entry that comprises the primary form of each word-element representation of the lattice corresponding to the entry and that does not include the alternate form of each word-element representation.

43. The method of claim 42 wherein the primary form of each word-element representation comprises a kanji character and the alternate form of each word-element representation comprises at least one kana character.

44. The method of claim 42 wherein each word-element representation is adapted to further comprise an optional word part that may optionally be used in conjunction with the primary form and wherein the normalized form comprises the primary form of each word-element representation and any optional word parts corresponding to each primary form that are present in the word-element representation.

45. The method of claim 44 wherein the optional word part comprises okurigana characters.

46. The method of claim 42 wherein each word-element representation is adapted to further comprise an optional word part that may optionally be used in conjunction with the primary form and to further comprise a rarity indicator indicative of whether usage of such an optional word part is relatively common or relatively rare, and wherein, if the rarity indicator indicates that usage is relatively common, the normalized form comprises the primary form of each word-element representation and any optional word parts corresponding to each primary form that are present in the word-element representation, whereas, if the rarity indicator indicates that usage is relatively rare, the normalized form comprises the primary form of each word-element representation alone.

47. The method of claim 46 wherein the optional word part comprises okurigana characters.

48. The method of claim 42 wherein each lattice is adapted to further comprise an alternate-orthography-only word element comprising only alternate orthography characters and wherein the normalized form comprises the primary form of each word-element representation and any alternate-orthography-only word elements that are present in the lattice.

* * * * *